United States Patent [19]

Miyaoh

[11] Patent Number: 5,161,498
[45] Date of Patent: Nov. 10, 1992

[54] STEEL LAMINATE TYPE CYLINDER HEAD GASKET

[75] Inventor: Yoshio Miyaoh, Tokyo, Japan

[73] Assignee: Ishikawa Gasket Co., Ltd., Tokyo, Japan

[21] Appl. No.: 762,777

[22] Filed: Sep. 20, 1991

[30] Foreign Application Priority Data

Sep. 28, 1990 [JP] Japan .............................. 2-102155[U]

[51] Int. Cl.$^5$ .............................................. F02F 1/00
[52] U.S. Cl. ................................ 123/193.3; 123/193.5; 277/235 B
[58] Field of Search ........ 123/193 CH, 193 H, 193 C; 277/235 R, 235 A, 235 B, 227, 180, 213

[56] References Cited

U.S. PATENT DOCUMENTS

| | | | |
|---|---|---|---|
| 4,243,231 | 1/1981 | Sugawara | 277/235 B |
| 4,519,619 | 5/1985 | Doyle | 277/235 B |
| 4,705,278 | 11/1987 | Locacius et al. | 277/235 B |
| 4,756,537 | 7/1988 | Beyer et al. | |
| 4,776,602 | 10/1988 | Gallo | 277/235 B |
| 4,781,389 | 11/1988 | Beyer et al. | 277/235 B |
| 4,791,897 | 12/1988 | Udagawa | 277/235 B |
| 4,803,965 | 2/1989 | Udagawa et al. | 123/193 CH |
| 4,809,653 | 3/1989 | Udagawa et al. | 123/193 CH |

FOREIGN PATENT DOCUMENTS

| | | |
|---|---|---|
| 209708 | 1/1987 | European Pat. Off. . |
| 2064677 | 6/1981 | United Kingdom . |

*Primary Examiner*—E. Rollins Cross
*Assistant Examiner*—M. Macy
*Attorney, Agent, or Firm*—Kanesaka and Takeuchi

[57] ABSTRACT

A steel laminate type cylinder head gasket is installed in an engine having a cylinder block with a cylinder bore, a cylinder head with an auxiliary combustion chamber and a mouth plate attached to the cylinder head. The gasket is formed of first and second plates laminating together, a compressible member and a sealing device for sealing around the cylinder bore. The first plate includes a hole adjacent the cylinder bore. The hole is located under a part of the mouth plate to form an elongated strip between the hole and the cylinder bore. The compressible member is situated inside the hole to support the mouth plate. A bead is also formed at the elongated strip to support the mouth plate together with the wire ring. Accordingly, damage by movement of the mouth plate is substantially prevented.

13 Claims, 3 Drawing Sheets

STEEL LAMINATE TYPE CYLINDER HEAD GASKET

BACKGROUND OF THE INVENTION AND RELATED ART STATEMENT

The present invention relates to a steel laminate type cylinder head gasket for an internal combustion engine with an auxiliary combustion chamber In an engine with an auxiliary combustion chamber, a cylinder head is provided with a mouth plate to close the auxiliary combustion chamber. When the engine is operated, gas at first combusts at the auxiliary combustion chamber, which leads combustion of gas in a cylinder bore. Therefore, the mouth plate receives combustion pressure from both the auxiliary combustion chamber and the cylinder bore.

As shown in FIGS. 1 and 2, a cylinder head J is provided with a depression K, to which a mouth plate L is inserted, so that an auxiliary combustion chamber M is defined inside the depression K. A gasket 10 is installed between the cylinder head J and a cylinder block P to seal therebetween. The mouth plate L is supported partly by a portion N of the gasket 10.

As stated above, when the engine is operated, combustion pressure is applied to the mouth plate L, so that large pressure is applied to the portion N of the gasket. Sometimes, the mouth plate L moves up and down.

In the conventional steel laminate gasket 10 as shown in FIGS. 1 and 2, the gasket 10 is formed of an upper plate, lower plate and three middle plates. A wire ring is installed around the cylinder bore Hc. Since the gasket 10 does not resiliently support the mouth plate, combustion gas is liable to leak through the mouth plate.

In order to resiliently support the mouth plate, one of the middle plates is replaced by a plate 11 with beads 12 at the portion N of the gasket, which is disclosed in Japanese Patent Publication (KOKAI) No. 59-90745.

In U.S. Pat. Nos. 4,791,897, 4,803,965 and 4,809,653, one of the middle plates is provided with different kind of beads on and around the portion N to support the mouth plate L and seal therearound.

The gaskets as proposed by the patents operate as intended. However, in case the portion N of the gasket need not be compressed strongly by beads, the portion of the middle plate where the beads are formed is cut, to which a compressible material is disposed for supporting the mouth plate L.

When the engine is started, large force is applied to the mouth plate L to thereby strongly compress the compressible material, the wire ring and a cured portion around the wire ring under the mouth plate L. This force is concentrated at a border between the mouth plate and the cylinder head, which results in damaging the curved portion around the wire ring. The curved portion may be broken or partly cut by the force applied to the mouth plate L.

Accordingly, one object of the invention is to provide a steel laminate type cylinder head gasket, which can securely support a mouth plate even if high pressure is applied to the mouth plate.

Another object of the invention is to provide a steel laminate type cylinder head gasket as stated above, which can securely seal around the cylinder bore and the mouth plate while resiliently supporting the mouth plate.

A further object of the invention is to provide a steel laminate type cylinder head gasket as stated above, which can easily and economically be manufactured.

Further objects and advantages of the invention will be apparent from the following description of the invention.

SUMMARY OF THE INVENTION

A steel laminate type cylinder head gasket of the invention is installed in an internal combustion engine with an auxiliary combustion chamber. Namely, a cylinder head is provided with a depression for an auxiliary combustion chamber and a mouth plate to close the depression. The gasket is interposed between the cylinder head and a cylinder block, and supports the mouth plate.

The gasket is basically formed of first and second plates extending substantially throughout an entire area of the engine, a compressible member to support the mouth plate and sealing means around a cylinder bore for sealing therearound.

The first plate includes a first hole corresponding to the cylinder bore of the engine, and a second hole situated adjacent to the first hole and located under a part of the mouth plate. The second hole is defined by a first curved line located adjacent to and at a predetermined distance away outwardly from a part of a contour of the mouth plate, and a second line located adjacent to and at a predetermined distance away from a part of a contour of the cylinder bore. A curved strip or an elongated portion is, therefore, formed between the first and second holes.

A first bead is formed in the curved strip for supporting the mouth plate near the cylinder bore. The first bead may extend partly outwardly beyond the curved strip to surround the cylinder bore. The compressible member is situated in the second hole to support the mouth plate.

Preferably, the second plate is an upper plate situated above the first plate and includes a curved portion situated around a second hole for the cylinder bore, and a flange extending in a direction away from the second hole. The flange is located under the first plate. Also, a wire ring is used as the sealing means, and is located between the curved portion and the first plate.

In the present invention, since the curved strip with the first bead is formed between the first and second holes, the mouth plate is supported by the first bead as well as the wire ring. Accordingly, in case the mouth plate is strongly urged against the gasket when the engine is started, the gasket is not damaged at all. Also, since the compressible member is situated in the second hole, the mouth plate is supported at a moderate pressure when the gasket is tightened.

The first plate may include a second bead situated adjacent to and at a predetermined distance away from the first curved line to surround the second hole. The second bead includes end portions intercepting the first bead. As a result, the second hole is surrounded by the first and second beads, so that the area around the second hole is securely sealed.

The first bead may extend entirely around the cylinder bore to seal around the same together with the wire ring. The gasket may include some other plates to laminate with the first and second plates.

DETAILED DESCRIPTION OF PREFERRED EMBODIMENTS

Figure 1:
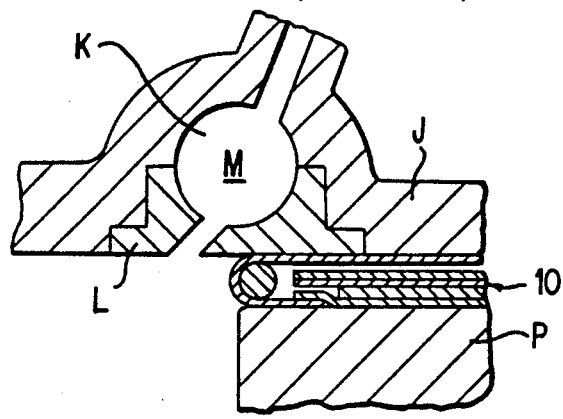
FIG. 1 is an explanatory section view of a conventional gasket installed between a cylinder head and a cylinder block.
Figure 2:
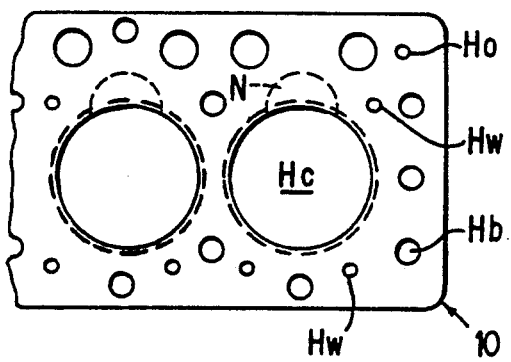
FIG. 2 is a plan view of a part of the conventional gasket shown in FIG. 1.
Figure 3:
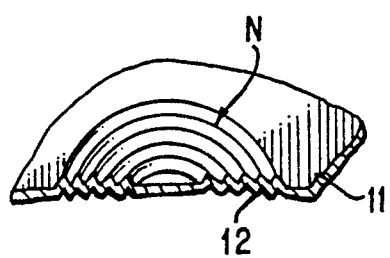
FIG. 3 is a perspective view of a part of a middle plate used in a conventional gasket.
Figure 4:
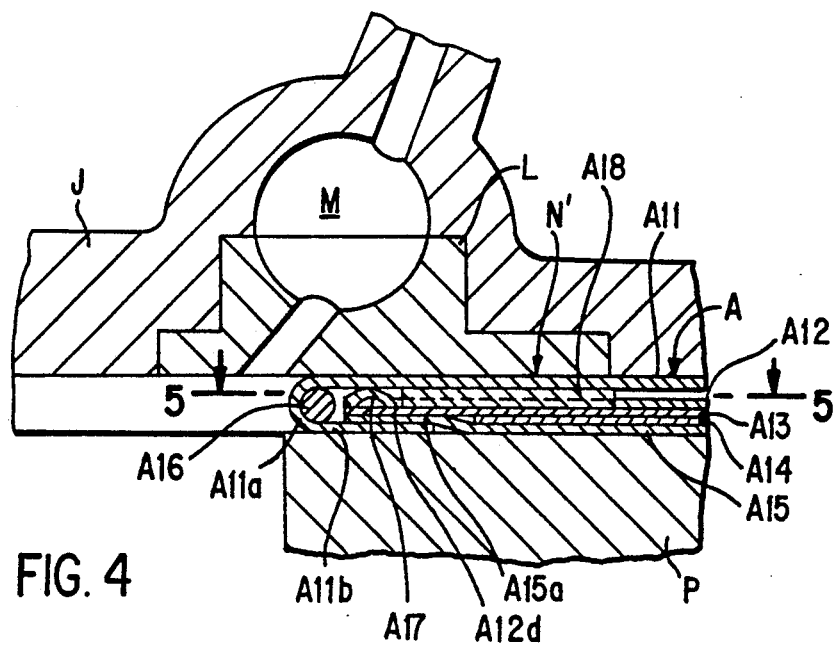
FIG. 4 is an explanatory section view of a first embodiment of a steel laminate gasket of the invention installed between a cylinder head and a cylinder block.
Figure 5:
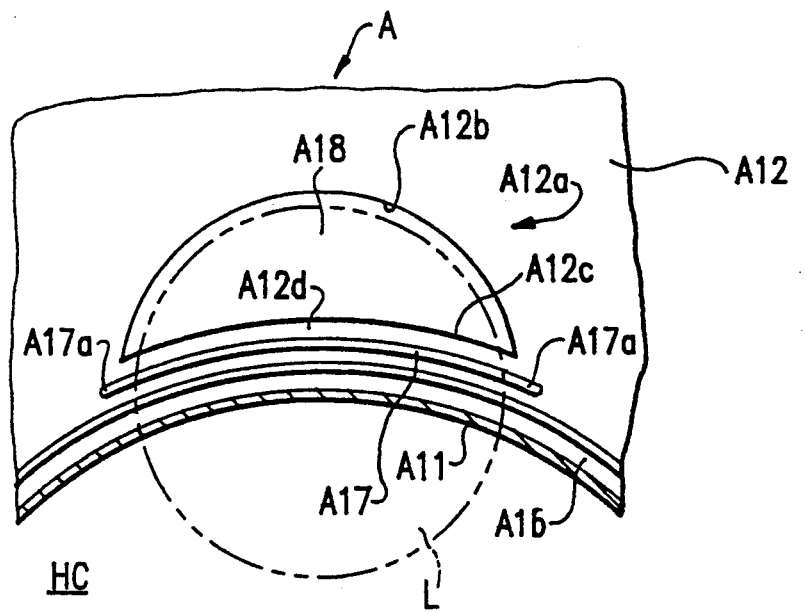
FIG. 5 is a section view taken along a line 5—5 in FIG. 4.

Referring to FIGS. 4 and 5, a first embodiment A of a steel laminate type cylinder head gasket of the invention is shown. The gasket A includes a plurality of cylinder bores Hc, water holes Hw, oil holes Ho, bolt holes Hb and so on, as in the conventional gasket shown in FIG. 2. Since the present invention is directed to a sealing mechanism around the cylinder bore Hc, sealing means for sealing around other holes is not explained. Any sealing means may be used for sealing around other holes.

The gasket A of the invention is installed between a cylinder head J and a cylinder block P. The cylinder head J includes a mouth plate L to form an auxiliary combustion chamber M therein. The mouth plate L is supported by the gasket A at a portion N'.

The gasket A is formed of an upper plate A11, three middle plates A12, A13, A14 and a lower plate A15, which extend substantially throughout the entire area of the engine. A wire ring A16 is situated around the cylinder bore Hc.

The upper plate A11 includes a curved portion A11a to define the cylinder bore Hc, and a flange A11b extending from the curved portion A11a. The wire ring A16 is situated adjacent to the curved portion A11a.

As shown in FIG. 5, the middle plate A12 includes a hole A12a adjacent the cylinder bore Hc. The hole A12a is defined by an outer line A12b larger than a part of a contour of the mouth plate L, and an inner line A12c located at a predetermined distance away from the cylinder bore Hc.

A curved elongated portion A12d is, therefore, formed in the middle plate A12 between the cylinder bore Hc and the hole A12a. In the elongated portion A12d, a bead A17 is formed so that end portions A17a of the bead A17 extend slightly beyond the elongated portion A12d or a portion under the mouth plate L.

A compressible sheet A18 made of graphite is situated in the hole A12a. The thickness of the compressible sheet A18 is greater than that of the plate A12. When the gasket A is tightened, the compressible sheet A18 is compressed to slightly resiliently support the mouth plate L. The compressible sheet A18 does not substantially flow outside the hole A12a.

The middle plate A13 is situated under the middle plate A12 and supports the compressible sheet A18 thereon. The middle plate A14 is situated under the middle plate A13, and includes a relatively large hole around the cylinder bore Hc. The middle plate A14 does not overlap the flange A11b.

The lower plate A15 is situated under the middle plate A14. However, an edge portion A15a of the lower plate A15 is located above the flange A11b.

When the gasket A is situated between the cylinder head J and the cylinder block P and is tightened, the wire ring A16, the bead A17 and the compressible sheet A18 are compressed. The mouth plate L is slightly resiliently supported by the compressible sheet A18. The wire ring A16 seals around the cylinder bore Hc.

In the gasket A, the elongated portion A12c is formed between the hole A12a and the cylinder bore Hc, in which the bead A17 is located to extend beyond a portion that the mouth plate L sits. Therefore, the mouth plate L is supported by the bead A17 and the wire ring A16 as well as the upper plate A11.

Accordingly, even if large force is formed and applied to the mouth plate L when the engine is started or operated, such large force is well supported by the bead A17, the wire ring A16, the compressible sheet A18 and the upper plate A11. Therefore, when the engine is started or operated, the mouth plate L does not substantially move, so that the upper plate A11 is not damaged by the mouth plate L. Leakage of combustion gas from the mouth plate L is also prevented.

Figure 6:
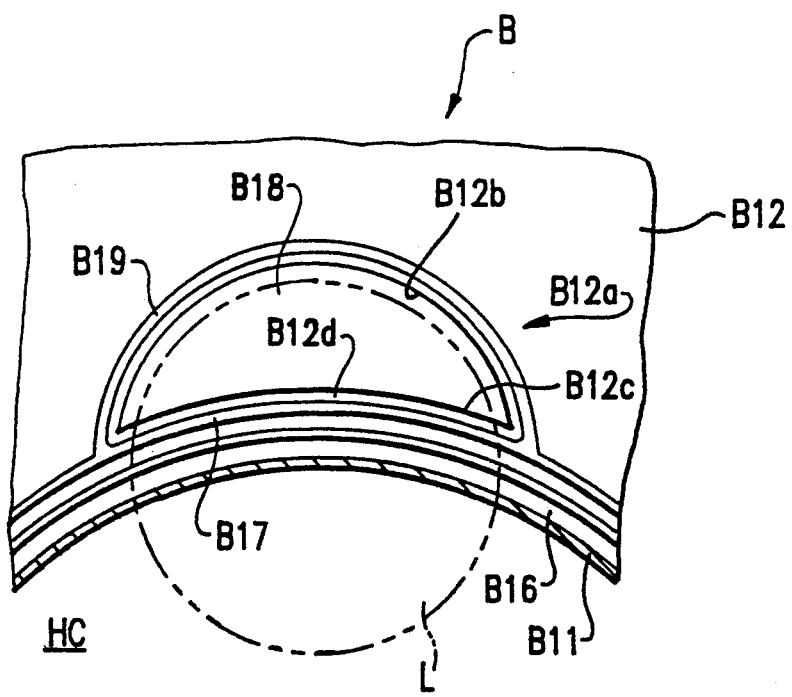
FIGS. 6–8 are section views, similar to FIG. 5, for showing second to fourth embodiments of the steel laminate gasket of the invention.

FIG. 6 shows a second embodiment B of a steel laminate type cylinder head gasket of the invention. The gasket B is formed of an upper plate B11, three middle plates B12, B13, B14, a lower plate B15, and a wire ring B16, as in the gasket A. However, the detailed structure of the middle plate B12 is different from that of the middle plate A12.

In particular, the middle plate B12 is provided with a hole B12a surrounded by an outer line B12b and an inner line B12c, and a curved elongated portion B12d between the cylinder bore Hc and the hole B12a, as in the middle plate A12. However, the middle plate B12 is provided with bead B17 extending entirely around the cylinder bore Hc, and a bead B19 situated around the hole B12a. The bead B19 intersects the bead B17.

In the gasket B, the bead B17, the wire ring B16 and a compressible sheet B18 support the mouth plate L, as in the gasket A. Also, since the bead B19 is located outside the compressible sheet B18, even if combustion gas leaks through the mouth plate L, the bead B19 seals around the mouth plate L. Also, the bead B17 seals around the cylinder bore in addition to the wire ring B16. The gasket B operates as in the gasket A.

Figure 7:
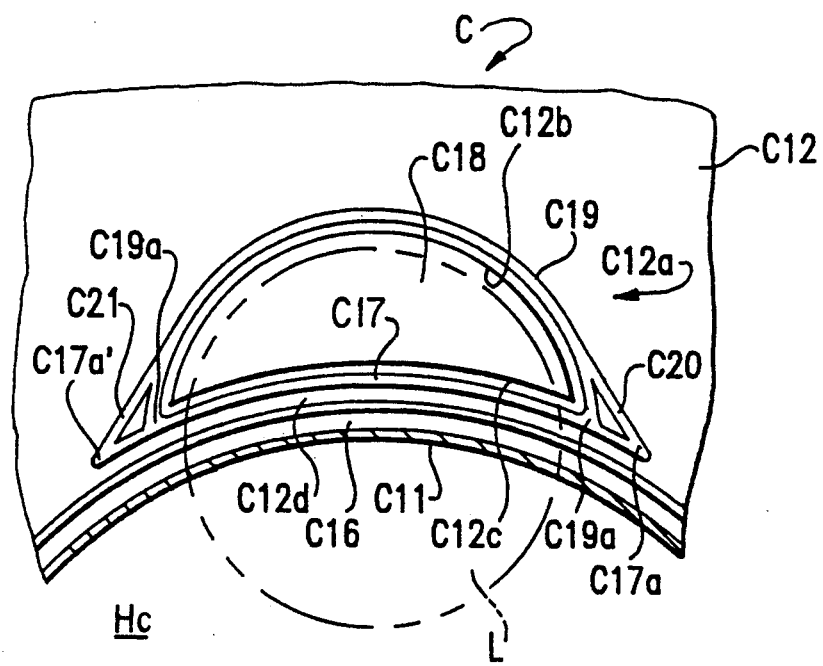

FIG. 7 shows a third embodiment C of a steel laminate type cylinder head gasket of the invention. The gasket C is formed of an upper plate C11, three middle plates C12, C13, C14, a lower plate C15, and a wire ring C16, as in the gasket A. However, the detailed structure of the middle plate C12 is different from that of the middle plate A12.

In particular, the middle plate C12 is provided with a hole C12a surrounded by an outer line C12b and an inner line C12c, and a curved elongated portion C12d between the cylinder bore Hc and the hole C12a, as in the middle plate A12. However, the middle plate C12 is provided with a bead C17 extending slightly longer than the bead A17, a bead C19 situated around the hole C12a, and two beads C20, C21.

The bead C19 intersects the bead C17 at points C19a. The bead C20 extends linearly from an end C17a to a middle portion of the bead C19, while the bead C21 extends linearly from an end C17a, to a middle portion of the bead C19.

In the gasket with the mouth plate L, the mouth plate L may move slightly inside the cylinder head J. As a result, combustion gas is liable to leak especially at the points C19a where the bead C19 intersects the bead C17. In order to securely seal the points C19a, the beads C20, C21 are formed. Namely, the leaked gas is prevented from passing beyond the beads C20, C21.

In the gasket C, the bead C17, the wire ring C16 and a compressible sheet C18 support the mouth plate L, as in the gasket A. The beads C19, C20, C21 securely seal around the mouth plate L. The gasket C operate as in the gasket A.

Figure 8:
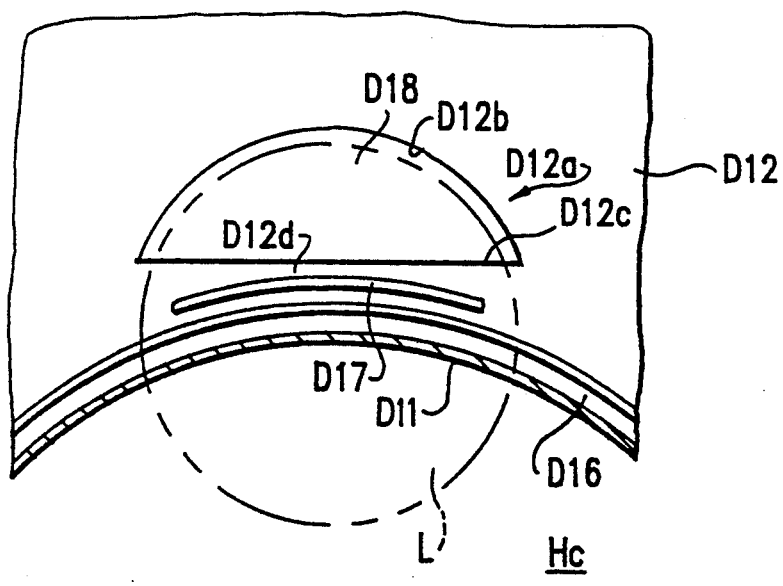

FIG. 8 shows a fourth embodiment D of a steel laminate type cylinder head gasket of the invention. The gasket D is formed of an upper plate D11, three middle plates D12, D13, D14, a lower plate D15, and a wire ring D16, as in the gasket A.

In the gasket D, however, the middle plate D12 is provided with a hole D12a surrounded by an outer line D12b and an inner straight line D12c, and an elongated portion D12d between the cylinder bore Hc and the hole D12a. Also, a bead D17 is formed inside the elongated portion D12d for supporting the mouth plate L.

In the gasket D, the bead D17, the wire ring D16 and a compressible sheet D18 support the mouth plate, as in the gasket A. Although the bead D17 does not extend outside the elongated portion D12d, the bead D17 can properly support the mouth plate L. Therefore, the gasket D operates as in the gasket A.

In the gasket of the present invention, a hole is separately formed adjacent to a cylinder bore, in which a compressible sheet is provided. A bead is formed in an elongated portion or a curved portion between the hole and the cylinder bore to support the mouth plate. Accordingly, an outer plate of the gasket is not substantially damaged by the mouth plate.

While the invention has been explained with reference to the specific embodiments of the invention, the explanation is illustrative and the invention is limited only by the appended claims.

What is claimed is:

1. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, comprising:

a first plate extending substantially throughout an entire area of the gasket, said first plate having a first hole corresponding to the cylinder bore of the engine, a second hole situated adjacent to the first hole under a part of the mouth plate, said second hole being defined by a first curved line located adjacent to and at a predetermined distance away from a part of a contour of the mouth plate and a second line located adjacent to and at a predetermined distance away from the cylinder bore, an elongated strip formed between the first and second holes, and a first bead formed in the elongated strip for supporting the mouth plate around the cylinder bore, a compressible member situated in the second hole to support the mouth plate, sealing means formed around the cylinder bore to seal therearound, and at least one second plate situated adjacent to the first plate to form a steel laminate gasket.

2. A steel laminate type cylinder head gasket according to claim 1, wherein said first bead extends at least partly beyond the elongated strip to strengthen the same.

3. A steel laminate type cylinder head gasket according to claim 2, wherein said second plate is an upper plate situated above the first plate, said upper plate including a third hole corresponding to the cylinder bore of the engine, a curved portion situated around the third hole, and a flange extending in a direction away from the third hole to be located under the first plate.

4. A steel laminate type cylinder head gasket according to claim 3, wherein said sealing means is a wire ring situated between the curved portion and the first plate, 5. A steel laminate type cylinder head gasket according to claim 4, wherein said first plate further includes a second bead situated adjacent to and at a predetermined distance away from the first curved line to surround the second hole, said second bead having end portions intercepting the first bead so that the second bead securely seals outside the mouth plate.

6. A steel laminate type cylinder head gasket according to claim 5, wherein said first bead extends entirely around the cylinder bore outside the wire ring for sealing around the cylinder bore.

7. A steel laminate type cylinder head gasket according to claim 5, wherein said first bead extends beyond intercepting points with the second bead, said first plate further including two third beads, each third bead extending between the first bead and the second bead so that the intercepting point is located between the third bead and the cylinder bore.

8. A steel laminate type cylinder head gasket according to claim 5, further comprising at least one third plate situated under the first plate, said flange being located outside the third plate.

9. A steel laminate type cylinder head gasket according to claim 5, wherein said compressible member is basically formed of graphite.

10. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, comprising:

a first plate extending substantially throughout an entire area of the gasket, said first plate having a first hole corresponding to the cylinder bore of the engine, a second hole situated adjacent to the first hole under a part of the mouth plate, said second hole being defined by a first curved line located adjacent to and at a predetermined distance away from a part of a contour of the mouth plate and a second line located adjacent to and at a predetermined distance away from the cylinder bore, an elongated strip formed between the first and second holes, and a first bead formed in the elongated strip for supporting the mouth plate around the cylinder bore, a second plate including a base portion extending substantially throughout the entire area of the gasket and situated above the first plate, a third hole corresponding to the cylinder bore of the engine, a curved portion integrally formed with the base portion around the third hole, and a flange integrally formed with the curved portion and extending in a direction away from the third hole to be located under a part of the first plate, a compressible member having a thickness thicker than a thickness of the first plate, said compressible member being situated in the second hole to support the mouth plate, a third plate extending substantially throughout the entire area of the gasket and being situated under the first plate to support the compressible member, said third plate having a fourth hole corresponding to the cylinder bore and an edge portion around the fourth hole, said fourth hole being situated above the flange of the second plate, and sealing means situated outside the curved portion of the second plate relative to the third hole and inside the first hole of the first plate so that when the gasket is installed in the engine, the mouth plate is supported by the compressible member, the elongated strip with the first bead and the sealing means together with the first and third plates.

11. A steel laminate type cylinder head gasket according to claim 10, wherein said first plate further includes a second bead situated adjacent to and at a predetermined distance away from the first curved line to surround the second hole, said second bead having end portions intercepting the first bead so that the second bead securely seals outside the mouth plate.

12. A steel laminate type cylinder head gasket according to claim 11, wherein said first bead extends entirely around the cylinder bore outside the wire ring for sealing around the cylinder bore.

13. A steel laminate type cylinder head gasket according to claim 11, wherein said first bead extends beyond intercepting points with the second bead, said first plate further including two third beads, each third bead extending between the first bead and the second bead so that the intercepting point is located between the third bead and the cylinder bore.

* * * * *